United States Patent Office 3,437,989
Patented Apr. 8, 1969

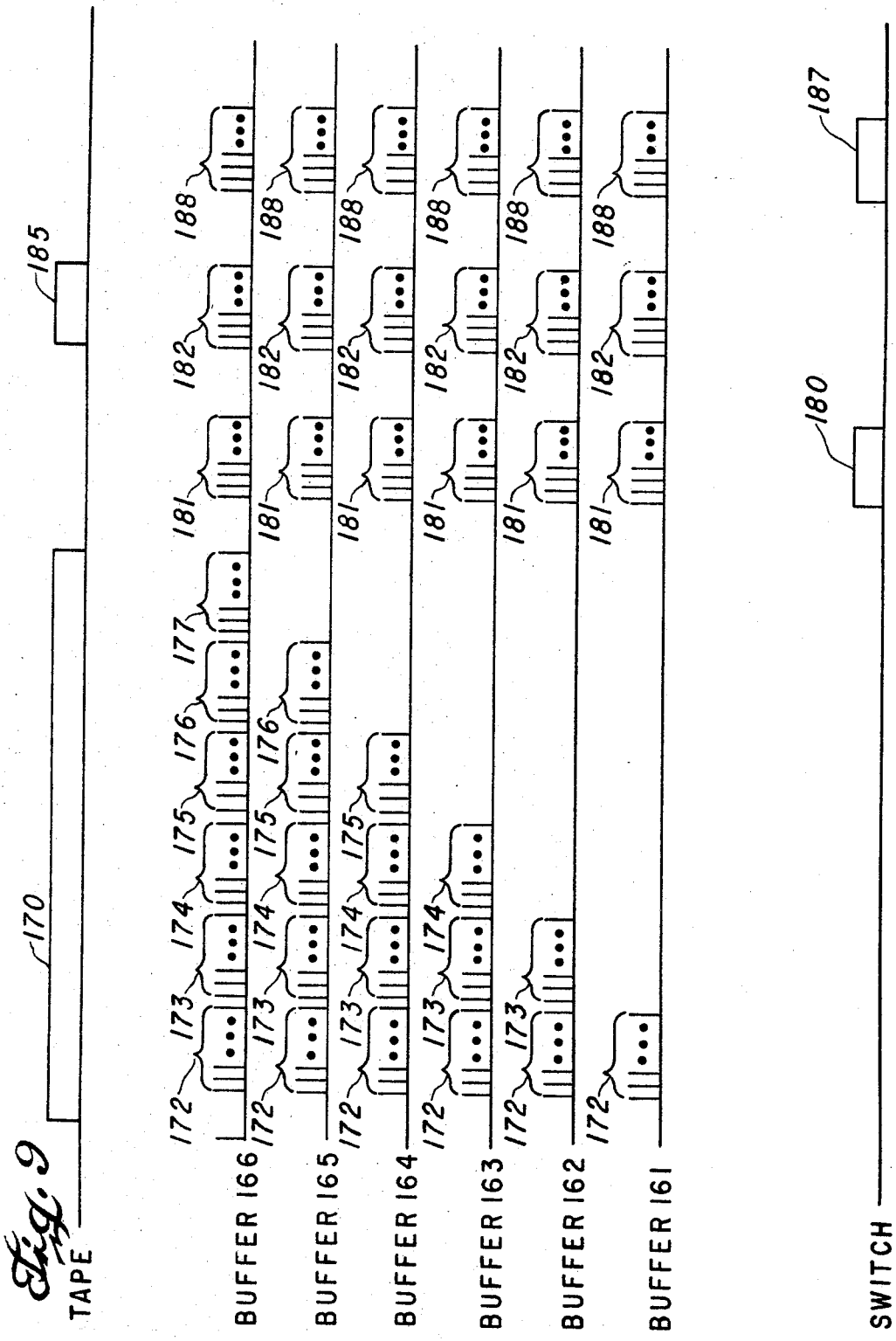

3,437,989
APPARATUS AND METHOD FOR CONTINU-
OUS MARINE MULTICHANNEL SEISMIC
EXPLORATION
Jack M. Proffitt, Houston, Tex., assignor to Texas Instruments Incorporated, Dallas, Tex., a corporation of Delaware
Filed June 7, 1966, Ser. No. 555,760
Int. Cl. G01v 1/13
U.S. Cl. 340—15.5       12 Claims

ABSTRACT OF THE DISCLOSURE

A plurality of groups of marine seismometers are spaced apart predetermined distances and are moved together with a mobile seismic source along a marine traverse. The signals from seismometers in each group are combined to produce a plurality of electrical signals in response to seismic disturbances from the seismic source. The source is preferably actuated at predetermined time intervals related to the distance traveled by a given seismometer group such that seismic disturbances are created at distances of the order of the spacing between seismometer groups. Digital analog signals are produced representative of the analog electrical signals and preferably are combined as digital signals which represent energy derived from common distance points.

---

This invention relates to marine seismic exploration, and more particularly, to a method and apparatus for use with a repetitive marine seismic energy source to produce a seismic record in which signals indicative of geophysical information are enhanced with respect to undesired noise.

The use of dynamite as the source of the seismic disturbances required for seismic exploration has long provided useful geophysical information. However, the use of dynamite as a source has shortcomings. In many locations its use is legally restricted. Further, the cost of the dynamite forms a significant part of the total cost of a seismic survey. Substitutes for dynamite as a source of marine seismic disturbances have been found in the form of repetitive sources such as gas guns, which are capable of producing low energy disturbances in water at a rapid rate. The use of such a repetitive source is subject to fewer legal restrictions than dynamite. Although the low energy of such a source characteristically gives rise to a seismic record with a lower signal-to-noise ratio than ordinary dynamite shooting, selected ones of the records obtained may be combined to produce a composite seismic record with a signal-to-noise ratio comparable to those records obtained with dynamite. While the composite seismic signal replaces several of the original seismic signals which are combined to produce it, the economy and rapidity of the repetitive source make feasible the use of more seismic disturbances than are used with dynamite. Consequently the resulting composite records may be as many in number as with dynamite.

However, there are limitations are on the extent to which signal processing techniques have been able to improve the quality of seismometer signals obtained using a repetitive source. In particular with the repetitive source disturbances information has been recorded for only one seismometer channel, thereby precluding the use of multichannel signal processing techniques.

It is therefore an object of the invention to make possible the use of advanced signal enhancement techniques with repetitive source seismic shooting.

It is another object of the invention to provide marine seismic exploration using repetitive source shooting and digital multichannel signal processing.

A still further object of the invention is to provide a digital recording system capable of digitally encoding and recording multichannel marine seismometer signals generated by repetitive source shooting.

In accordance with one aspect of the invention, repetitive seismic disturbances are produced in water, effects of said disturbances are detected on multiple seismometer channels, the analog electrical outputs of said channels are converted to digital electrical signals, and the digital signals corresponding to each of said multiple channels are separately recorded and subjected to multichannel signal processing.

Other objects, features and advantages of the invention will be more readily understood from the following detailed description when read in conjunction with the appended claims and attached drawings in which:

FIGURE 4 shows an apparatus for enhancing the signal-to-noise ratio, with respect to random noise, of the seismic data gathered by the apparatus of FIGURES 1 and 2.

FIGURE 9 is a pulse timing diagram for the output pulses from timing control 167 of FIGURE 8.

Figure 1:
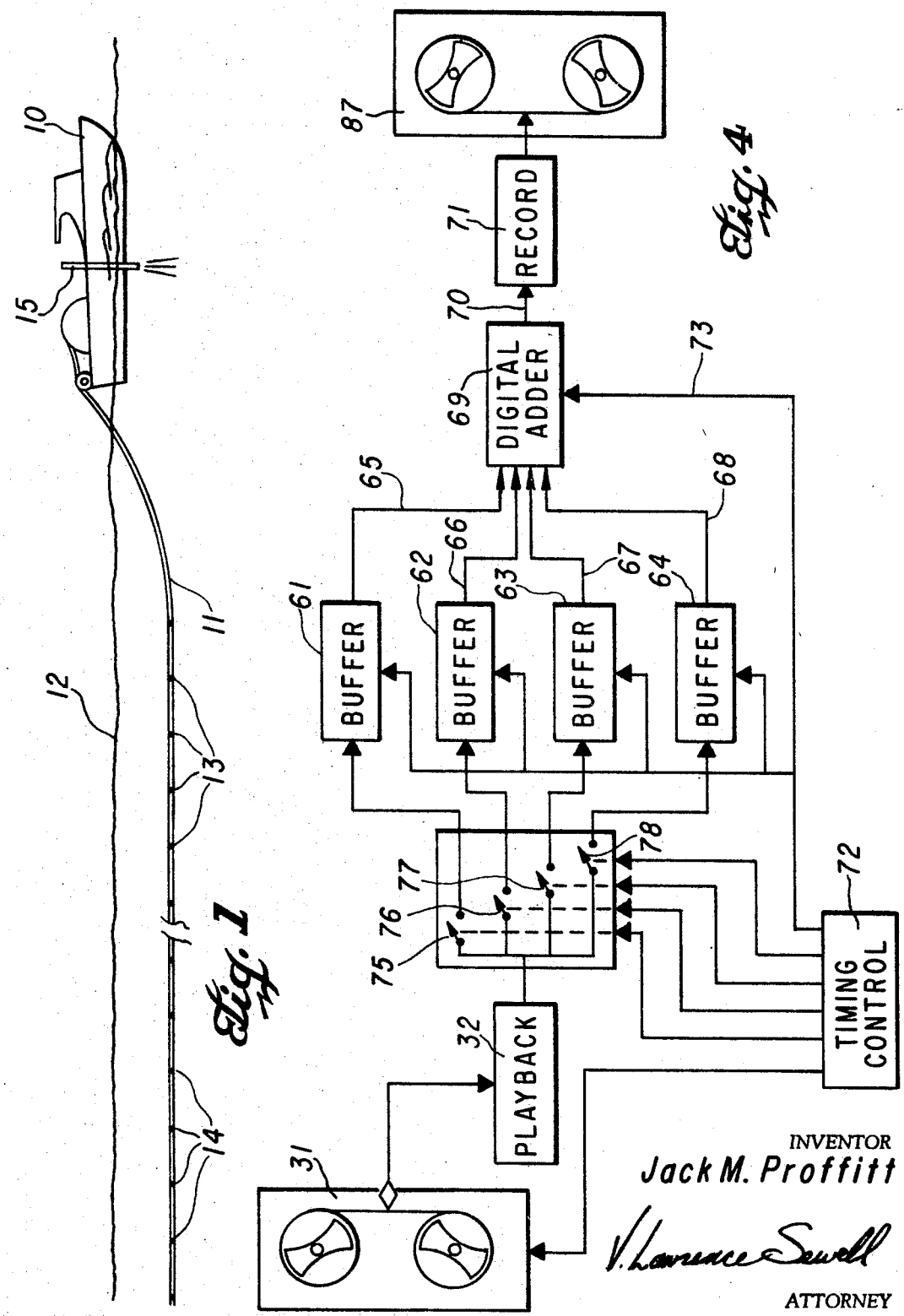
FIGURE 1 illustrates a ship, seismic source on the ship, and a marine seismometer streamer as utilized according to the invention.

Referring now to the drawing, FIGURE 1 illustrates the seismic source and detectors to be used in accordance with the invention. A ship 10 tows a marine seismometer 11 along a marine path beneath the surface 12 of the water. The streamer 11 is of the kind conventionally used with a dynamite source in marine seismic exploration. The streamer has pressure sensitive hydrophones 13 inside which are distributed along the length thereof. The hydrophones are divided into groups. All of the hydrophones in any one of the groups have the electrical output thereof connected in parallel. The paralleled output from each group is conducted along the inside of the streamer 11 to the ship 10. There may be, for example, 24 groups seismometers (only groups 13 and 14 being indicated in the drawing), each group having the output thereof connected to ship 10.

Seismic source 15 is of the repetitive type. Source 15 may, for example, be of the gas gun type which is commonly used in marine seismic exploration and described in the patent to W. B. Huckabay, 2,994,397, issued Aug. 1, 1961. Source 15 may also be two such gas guns fired at the same time to gain greater explosive power. In the use of such a source, the seismic disturbances created thereby are of a lower energy content than those produced by ordinary dynamite shooting, but the disturbances are produced more frequently than in the case of dynamite. The actual rate at which disturbances are produced by source 15 is determined by the distance which streamer 11 travels between disturbances. That is, it is desirable for the purposes of certain signal enhancement processing techniques that from one explosion to the next, the distance travelled by the streamer is some known multiple of the distance between groups of seismometers in the streamer. Once the distance to be travelled by the streamer between explosions or shots is established, and a speed is set for ship 10, the frequency of disturbances to be produced by source 15 may be readily determined. Where an accurate means of measuring the position of the ship 10, is available, source 15 may be triggered directly in response to a predetermined change in the position of the ship and streamer. The frequency of the disturbances produced in accordance with the method of the invention may be, for example, one disturbance each 9 seconds. The energy of each disturbance may be, for example, equivalent to four pounds of TNT. The firing of the source 15 may be controlled by the equipment for digitizing and recording the seismometer outputs, as described below in connection with FIGURE 2.

In the past, marine seismic exploration methods have utilized two approaches to towing a streamer such as streamer 11. According to one approach, the streamer is left stationary in the water during the production of a seismic disturbance. During this period, ship 10 continues to move but unreels more length of streamer, so that the part of the streamer already in the water does not move. Then, after the termination of the seismic disturbance and the recording of all the significant seismic reflection signals, ship 10 reels on that portion of the streamer which was reeled out during shooting and recording, so that that portion can be reeled out again during the next shooting and recording interval.

The second approach is to tow the streamer continuously, even during the performance of shooting and recording. The latter approach generally requires a somewhat more refined streamer construction than the former in order that noises transmitted to the hydrophones due to the motion of the streamer through the water will be minimized. In the seismic system of the present invention, seismic disturbances are created by source 15 so frequently that there is not time to reel in a significant portion of streamer 11 after each shot. Hence, the invention will be employed with continuous towing of the streamer 11.

Figure 2:
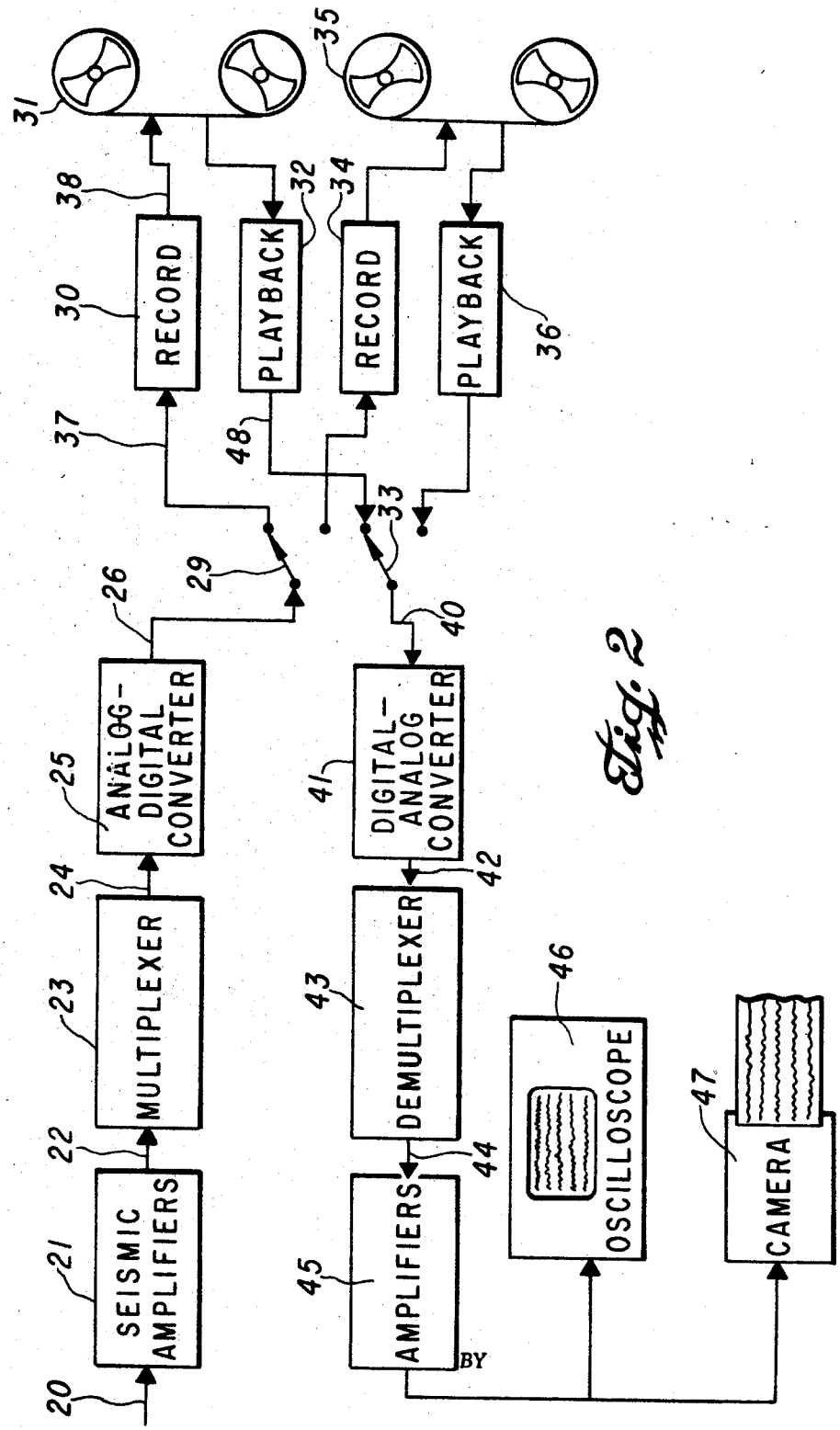
FIGURE 2 shows a system for digitally encoding and recording the seismometer signals received from the streamer of FIGURE 1.

FIGURE 2 illustrates the data gathering equipment used in accordance with the invention. The input 20 to seismic amplifiers 21 represents the twenty-four analog signal channels which are the electrical outputs of the twenty-four groups of hydrophones 13–14 in seismic streamer 11. Amplifiers 21 are correspondingly twenty-four amplifiers, one for each of the streamer channels. Multiplexer 23 is conventional, sequentially sampling through the outputs of the twenty-four amplifiers at its inputs, represented by input 22, and producing the sequence of analog samples from each of the channels at its output 24. An example of a suitable multiplexer is the Model 844 multiplexer sold by Texas Instruments Incorporated, Dallas, Tex.

Analog-to-digital converter 25 is also conventional which produces at its output 26 a digital representation for each of the analog samples appearing at its input 24. In marine seismic systems using dynamite sources, a multiplexer and analog-to-digital converter are often found in a single sampling and digitizing system manufactured for that purpose. Such a system often also contains a timing control circuit for controlling the firing of the dynamite in relation to the operation of the recording system. Such control circuitry, though not shown, is equally useful in the apparatus of FIGURE 2. The output of converter 25 is in parallel form; that is output path 26 represents a plurality of digital signal paths transmitting all the bits of a digital word simultaneously to a corresponding number of switching devices represented by switch 29.

The switches represented by switch 29 are switched simultaneously with corresponding switches represented by switch 33 so that, when switch 29 is connected to its alternate terminal indicated in the drawing, switch 33 is likewise connected to its alternate terminal. As with output 26 from analog-to-digital converter 25, the input 37 from switch 29 to record circuitry 30 is a group of signal paths for transmitting digital words in parallel form. Accordingly, record circuit 30 is a common multiple channel circuit associated with multitrack magnetic digital recording tape transports for recording the signal on each input channel 37 on one of the tape tracks. Thus, the outputs of record circuit 30, represented by path 38, are connected to the multiple record heads of transport 31. Tape transport 31 and its companion transport 35, are the multitrack digital tape transports commonly used for seismic recording. Each transport has a group of recording heads and, displaced somewhat along the length of the tape, a group of playback heads.

Figure 3:
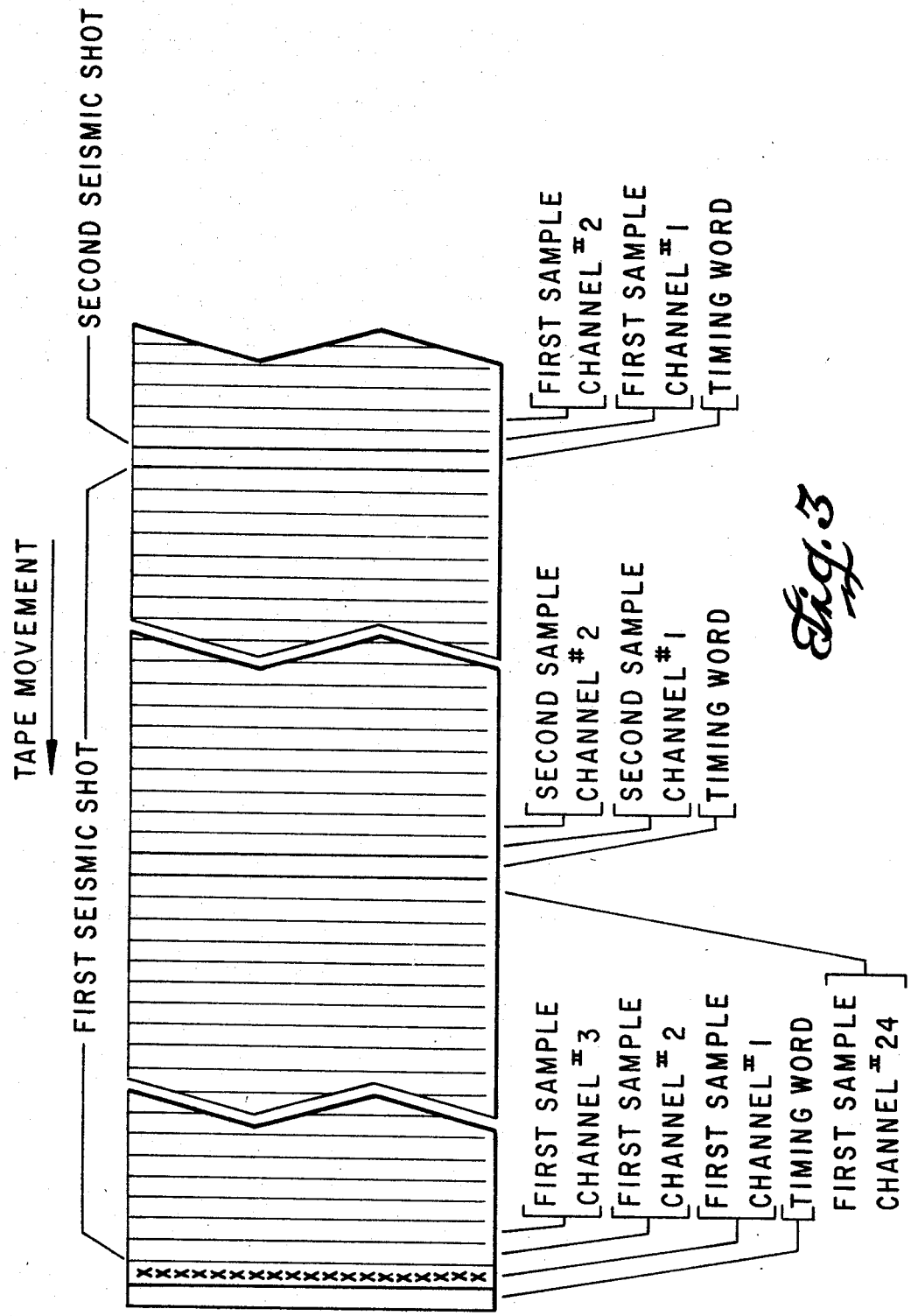
FIGURE 3 is a diagram of the magnetic tape recording format use in the apparatus of FIGURE 2.

A common format used for recording the seismic information on the tape of transports 31 and 35 is shown in FIGURE 3. The X's across the tape in FIGURE 3 represent the individual digital bits recorded across the tape for the digital word, "FIRST SAMPLE, CHANNEL #1." The bits are likewise recorded for successive digital words. The significance of the digital words recorded along the length of the tape is shown by the labels in FIGURE 4, in which "CHANNEL #1" corresponds to seismometer group #1, "CHANNEL #2" corresponds to seismometer group #2, and so forth. The first sample for each of the seismic channels 1–24 is, of course, obtained by the rapid sequential switching of the multiplexer 23 from one seismic channel to the next. The digital representation of each sample is stored on the tape as shown. The second sample results from the second switching of the multiplexer across the input channels. A timing word is recorded between one group of samples and the next. After all the seismic records for the first seismic shot have been recorded on the tape, those for the second shot are recorded in like manner as indicated in FIGURE 3. All the digital words in the group of, say, the first samples, represent the signals produced by the various seismometer groups at approximately the same time. The behavior of the signal from any one seismometer group can be determined only from the examination of all the samples of that channel for the corresponding seismic shot.

The outputs of the playback heads from transport 31 are applied to playback circuit 32 which produces in parallel form at the output 48 thereof the digital bits recorded by transport 31. The outputs of playback circuit 32 represented by path 48 are connected by means of switch 33 to the corresponding digital inputs 40 of digital-to-analog converter 41. Record circuit 34, playback circuit 36 and the connection thereof to the record and playback heads of transport 35 are equivalent to the construction and arrangement of record circuit 30 and playback circuit 32.

Digital-to-analog converter 41 converts each of the digital words applied to its input in parallel form to a sequence of analog sample voltages at output 42 thereof. Demultiplexer 43 sequentially connects the signal on a single input channel 42 to multiple output channels 44 as the demultiplexing section of the DFS/10,000 Digital Field System manufactured by Texas Instruments Incorporated. Demultiplexer 43 also contains conventional filters for the purpose of causing the waveform on each of the output channels represented by output 44 to be a smooth waveform rather than the sequence of analog samples obtained by periodically connecting output 42 of converter 41 to one of the output channels of demultiplexer 43. Demultiplexer 43 is arranged in the normal way so that each of its output channels represented by output 44 represents one of the twenty-four channels applied to the system at inputs 20 of amplifiers 21. Thus amplifiers 45 represent twenty-four amplifiers, one to amplify the seismometer signal from each streamer channel. The multiple channel output of amplifiers 45 is applied simultaneously to a multiple channel long persistance oscilloscope 46 of the type normally used to display seismic traces and to a seismic oscillographic camera 47.

In the operation of the system of FIGURE 2, the signals received from streamer 11 at input 20 are first processed with switches 29 and 33 in the positions shown. That is, the twenty-four chanels of analog seismic signals are converted to digital form and stored on tape transport 31. Concurrently with the recording of the digitized seismic signals on said tape, the playback heads of transport 31 detect the signals just previously recorded. Digital-to-analog converter 41 and demultiplexer 43 convert the digital record to multiple electrical analog seismic signals which are then applied to oscilloscope 46 and camera 47. By observing oscilloscope 46 and the record from camera 47, an operator may monitor the quality of the digital record being made on the tape of transport 31. When the whole tape on transport 31 has been used to record the incoming seismic data, switches 29 and 33 are changed to their alternate positions and the data continues to be recorded on transport 35 without appreciable interruption. If seismic disturbances are being produced approximately once each nine seconds and the seismometer signals are recorded for approximatetly five seconds after each disturbance, there are four seconds during which transport 35 may be switched into operation by the manual actuation of switches 29 and 33, without interrupting recording. Such avoidance of interruption is significant because of the rapid rate at which the seismic disturbances are created in the method of the invention. If recording were interrupted for a minute, the data from six shots might be lost.

While seismic data is being recorded on transport 35, the tape on transport 31 is rewound. Then for a short time switch 33 is changed back to the position shown in drawing without changing the position of switch 29, so that transport 35 continues to record incoming seismic data while the input to digital analog converter 41 is taken from tape transport 31. During this interval, selected portions of the tape on said transport are played back to specifically check transport alignment and skew problems. Switch 33 is then connected back to its alternate terminal to allow playback of the information recorded on tape transport 35 for the remainder of the time that the transport is being used. During the remaining time, while transport 35 is recording the incoming seismic data, a reel of fresh tape is placed on transport 31 in readiness for recording on that transport. When the whole reel on transport 35 has been used, recording is switched back to transport 31 and the transport 35 is treated as was transport 31 previously.

Thus, the circuit of FIGURE 2 makes possible the digitizing and recording of multiple seismic input data at a high rate. The arrangement of transports 31 and 35 provide the capability to record the seismic signals for every seismic disturbance without interrupting the repetition of the disturbances. The read-after-write circuits comprising playback circuits 32 and 36, the oscilloscope 46 and the camera 47 provide the ability to determine whether the high volume of input seismic data is being properly recorded.

FIGURE 4 illustrates apparatus for carrying out a digital signal processing method by which the signal-to-noise ratio of the seismic data recorded by the apparatus of FIGURE 2 may be improved. The recorded digital data is played back from a transport such as transport 31 and applied by means of playback circuit 32 to electronic switches 75-78. Signals from timing control 72 cause switch 75 to connect the output of transport 31 to the input of buffer 61. Buffer 61 is a conventional magnetic core digital memory equipped to store digital words sequentially applied to the input thereof, and on command read out, the words in the order they were stored. Buffer 61 is enabled to receive digital words from transport 31 until it has stored all the digital data corresponding to the twenty-four hydrophone signals from one seismic disturbance of source 15. Signals from timing control 72 then cause switch 76 to connect the output of transport 31 to buffer 62 until the digital data corresponding to the next seismic disturbance has been stored therein. Once each of the buffers 61-64 contains such a set of data, signals from timing control 72 cause transport 31 to cease playing back the digital words. A read signal applied by timing control 72 to buffers 61-64 causes each of the buffers to apply the first digital word stored therein to the input 65-68 of digital adder 69. Digital adder 69 produces at the output 70 thereof a digital word representative of the sum of the four digital input words. The sum word is transmitted in parallel form by means of record circuit 71 to transport 87 and recorded thereon. Upon completion of the operation of digital adder 69, timing control 72 again applies a read signal to buffers 61-64, applying the next stored word in each buffer to digital adder 69, and subsequently transferring the sum word to transport 87. Input 73 from timing control 87 to adder 69 synchronizes the operation thereof with the read signals to buffers 61-64. When buffers 61-64 are empty, timing control 72 signals transport 31 to resume playback, and switches 75-78 in turn connect the output of the transport to buffer 51 and then to buffers 62-64 in succession as previously described. The contents of these buffers are then added as before and the process repeated for as much of the record on transport 31 as is to be enhanced by this process.

Figure 5:
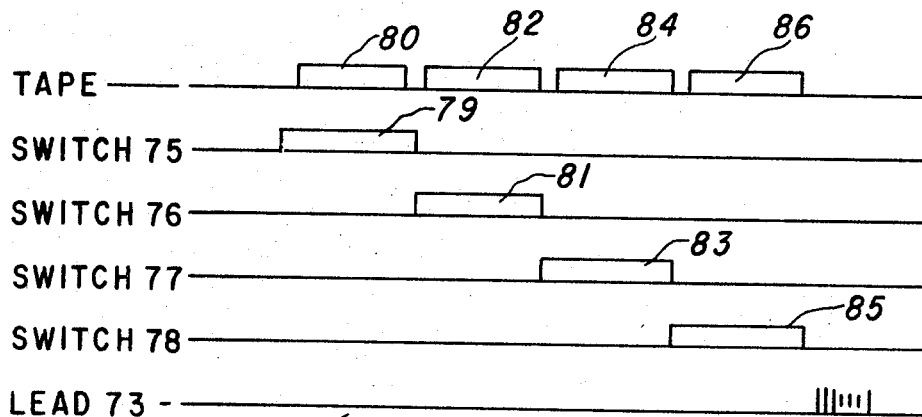
FIGURE 5 is a pulse timing diagram for the output pulses from timing control 72 in FIGURE 4.

Timing control 72 enables the components of the apparatus of FIGURE 4 to interact in the manner described. Control 72 may be, for example, a six track magnetic tape or drum recorder with the pulses as shown in FIGURE 5 recorded thereon. Alternatively, it may be a logic circuit designed to generate the required pulses. In FIGURE 5 there is illustrated by means of a pulse diagram the operation of the timing control 72. The first pulse generated is pulse 79, applied to electronic switch 75 to close that normally open switch. If timing control 72 is a multitrack recorder, pulse 79 may be generated by low pass filtering a recorded alternating current waveform. After the beginning of pulse 79, pulse 80 is applied to tape transport 31 to cause the transport to begin reading out the digital words recorded thereon. Pulse 80 may be applied, for example, to a relay actuating transport 31. The duration of pulse 80 is sufficient to allow the transferring to buffer 61 of all the digital word blocks corresponding to the seismic information gathered on a single seismic shot. When all this information has been stored in buffer 61, pulse 80 terminates. Pulse 79 then terminates and pulse 81 begins, closing switch 76. The application of pulse 82 to transport 31 causes the transfer of all the digital words corresponding to the next seismic shot into buffer 62. Pulses 83 and 84 transfer the digital words corresponding to the information from the third shot to buffer 63, and pulses 85 and 86 store the digital data from the fourth shot in buffer 64. Then there are applied to lead 73 the pulses which release the digital words in the output registers of the buffers 61-64 into digital adder 69 for summation. After all the digital words stored in buffers 61-64 have been summed, the pulse sequence shown in FIGURE 5 is repeated for the digital information corresponding to the next four shots.

The system of FIGURE 4 operates to add together the four seismic signals produced in response to four successive seismic disturbances by a group of paralleled hydrophones such as hydrophones 13 or hydrophones 14 in FIGURE 1. In analog terms, this would amount to taking, for example, the first trace from each of four successive groups of twenty-four traces and adding the amplitudes of the four traces which correspond to the same elapsed time after the seismic disturbance. The second traces in the four groups would be added and so on. Such processing produces a twenty-four channel record, but there are obviously one-fourth as many sets of twenty-four traces as the actual number of seismic disturbances created, since the composite seismic record produced by adder 69 replaces the four records which were added to obtain the composite record. The effect of the processing is to produce a group of twenty-four traces having a signal-to-noise ratio improved over that of the originally recorded traces. The reason for this is that the ship 10 does not move very far during four successive shots of source 15, so that the portion of the electrical seismometer signals which represent seismic energy reflected from sub-surface formations have approximately the same shape from one shot to the next, there being little change in the reflecting geological formations during the four shot interval. However, the random noise appearing at the streamer output for each shot bears no consistent relationship with the noise recorded in response to the other shots. Hence when the signals from four successive shots are added, the electrical signals from reflected seismic energy will tend to add while the random noise from the four shots at any given elapsed time will tend to cancel. It is the ability so to enhance the seismic data gathered with the system of FIGURE 1 that provides usable geophysical information despite the use of a relatively low energy seismic source. By the combination of the gathered data in the manner carried out by the apparatus of FIGURE 4, there result seismic signals having a signal-to-noise ratio comparable to those of signals gathered by the use of a higher energy seismic source.

The method performed by the apparatus of FIGURE 4 can be carried out before recording on transport 31 or 35 in FIGURE 2. In such operation, the transport 31 of FIGURE 4 would be replaced by a buffer storage similar to buffer 61 and with sufficient capacity temporarily to store digital data from analog-to-digital converter 25 while the apparatus of FIGURE 4 performs its operation. Then the output 70 of digtal adder 69 would be connected to switch 29 of FIGURE 2. It is likewise apparent that the method performed by the apparatus of FIGURE 4 could be carried out on a general purpose digital computer programmed to sequentially add the recorded digital words from four successive seismic disturbances as done by the apparatus of FIGURE 4.

After the process of FIGURE 4 has been accomplished, the digital seismic signals are subjected to multichannel processing. The term "multichannel processing" will be used here to mean processing mutiple groups of electrical signals wherein each group of signals is representative of data from a different seismic information channel, in such a manner as to produce output signals, some of which are dependent on input signals from more than one of said groups. The specific embodiment of multichannel processing to be described in connection with FIGURES 6–9 is common depth point stacking in which digital signals representing seismic data from a first seismometer channel and a first shot are combined with signals representing data from a second channel and second shot to produce digital signals representative of composite data. As is discussed below, the analog waveforms represented by the resulting output signals exhibits a better signal-to-noise ratio than the seismic waveforms after being processed only by the apparatus of FIGURE 4, and the improvement is both with respect to random noise and systematic noise such as multiple reflections. Such a process is illustrative of improved results which are provided by the use of multichannel processing in accordance with the invention and which could not be obtained through the use of data from only a single seismic channel for each shot.

Figure 6:
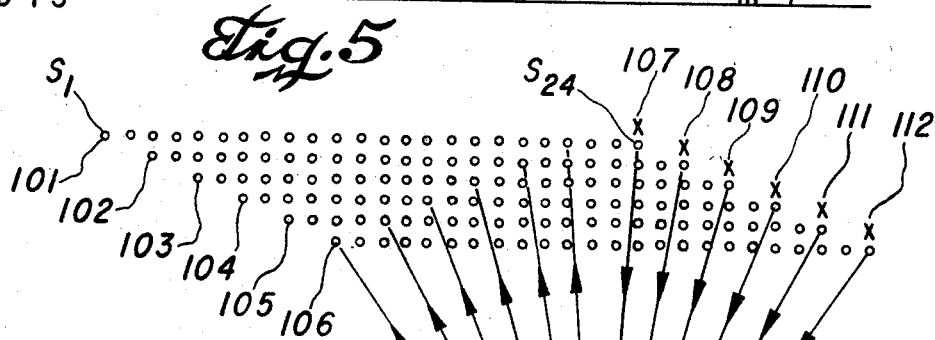
FIGURE 6 is a seismic ray path diagram illustrating the basis for a common depth point stacking process employed in accordance with the invention.
Figure 7:
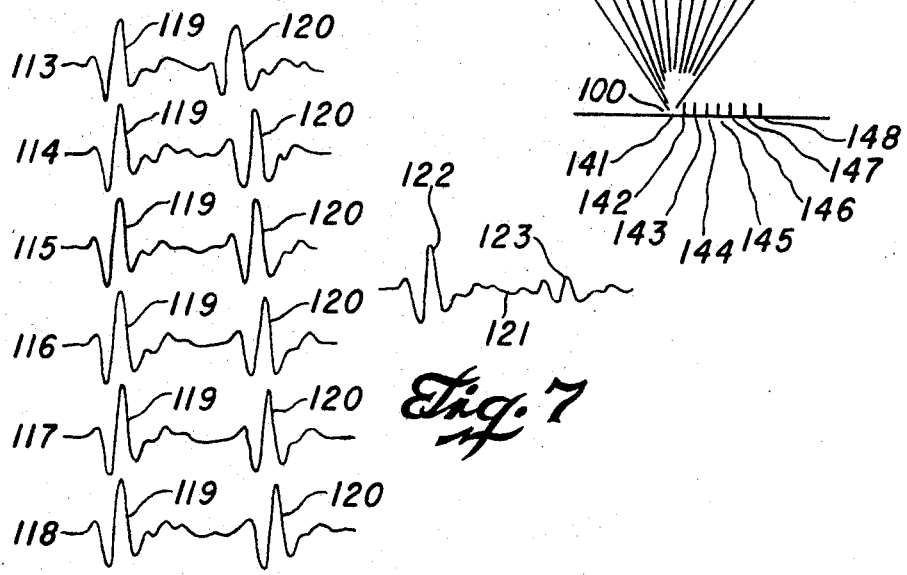
FIGURE 7 illustrates the waveforms of analog signals corresponding to the ray path diagram of FIGURE 6 and the result of combining the signals in a common depth point stacking process.

The process of common depth point stacking is itself well known in the art of seismic signal enhancement. The process is described in U.S. Patent No. 2,732,906 issued Jan. 31, 1956 to W. H. Mayne and in the copending application, Ser. No. 356,776 filed Apr. 2, 1964 by William A. Schneider, now abandoned. The principle upon which the stacking process is based is illustrated in FIGURES 6 and 7. In FIGURE 6, point 100 represents a point on an interface which reflects seismic waves. The line of dots 101 represents the seismic streamer positioned with respect to point 100 at the initiation of a seismic disturbance at point 107. Lines 102–106 represent the positions of the streamer corresponding to subsequent shots at points 108–112, respectively. The lines 101–106 are shown separated vertically in FIGURE 6, but the vertical position of the streamer is not considered to change; in the illustration of FIGURE 6, the vertical separation is merely for clarity. The position of each dot in lines 101–106 represents the position of a corresponding seismometer group in the streamer. The seismometer groups are numbered 1–24, seismometer groups number 1 and 24 being indicated by way of example as $S_1$ and $S_{24}$, respectively, in FIGURE 6. The location of the shots 107–112 may be displaced from the streamer in the dimension perpendicular to the page of FIGURE 6 so as not to damage the streamer.

It can be seen from FIGURE 6 that when the streamer is moved forward a distance equal to twice the separation of the seismometer groups for each successive shot, a number of the reflections detected by the streamer will be from the same reflecting point. Thus, the reflection detected by seismometer group 21 on the first shot is from point 100, but so is the reflection detected by group 17 on the second shot, group 13 on the third shot, group 9 on the fourth, group 5 on the fifth and group 1 on the sixth. Thus the signals generated by each of these groups should be quite similar, differences being primarily the result of noise. An illustrative group of seismic traces is shown in FIGURE 7. Trace 113 is a partial waveform of the seismic signal from seismometer group 24 on the first shot. Traces 114–118 correspond to the other five reflection signals from the same common depth point. The waves 119 correspond to primary reflections of the seismic wave, while waves 120 are caused by the well-known phenomenon of multiple reflections of the seismic wave. The traces 113–118 have been corrected for normal moveout; that is, they have been adjusted to account for the fact that reflected seismic waves are detected later at the seismometer more distant from the shot point. Therefore, the primary reflection waves 119 line one beneath the other. If the traces 113–118 are added, the waves 119 will tend to reinforce, while random noise present will tend to cancel, since there is no relationship between the random noise generated on one shot and the next. Moreover, since the reverberations waves 120 do not line up when the signals are corrected for normal moveout, they do not add to the extent of primary reflections signals 119. A scaled-down trace resulting from the addition of traces 113–118 is trace 121, with the resultant primary being shown as wave 122 and the resultant multiple reflection as wave 123. Thus, the addition or "stacking" of signals from a common depth point produces a composite signal of improved signal-to-noise ratio with respect to random noise and some systematic noise, such as multiple reflections.

If the number of common depth point signals stacked is increased, the signal-to-noise ratio of the composite output may be improved. If the streamer is moved, for example, only one detector group separating each shot, a twelve fold stack may be performed instead of the six fold stack illustrated with a corresponding increase in signal-to-noise ratio.

It is to be noted that in the use of common depth point stacking in the present invention, the common depth point signals to be combined or stacked are not the signals directly from the seismometer groups, but the output signals from the processing performed by the apparatus of FIGURE 4. As explained in connection with that figure, there is essentially obtained one composite signal per seismometer group for each four shots produced. Thus, in the operation of FIGURE 6, the dots represent the average position of the corresponding seismometer group during the four shots for which a composite signal is produced by the process illustrated in FIGURE 4. The indicated shot points are likewise average locations for the four shots, the shot points being spaced a distance from each other in an integer relation to the distance between seismometer groups.

Figure 8:
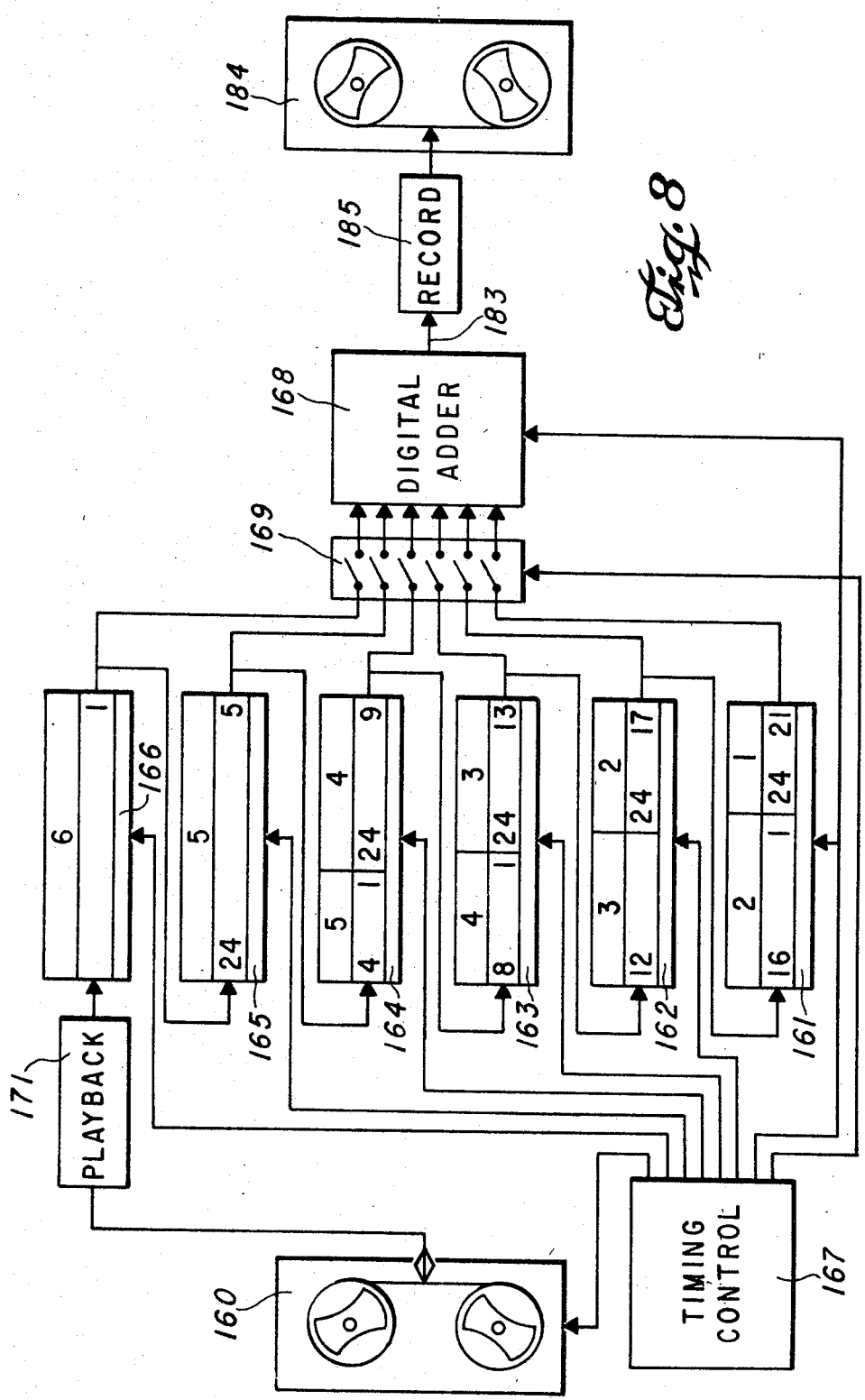
FIGURE 8 shows an apparatus for performing a common depth point stacking process in accordance with the invention.

FIGURE 8 illustrates apparatus for performing common depth point stacking digitally in accordance with the invention. It is the function of the apparatus to digitally perform the addition of the information corresponding to common depth points as illustrated in FIGURE 7. For the arrangement of FIGURE 6, the seismometer groups corresponding to the common depth points are as follows:

| Common depth point | 1st shot | 2nd shot | 3rd shot | 4th shot | 5th shot | 6th shot | 7th shot |
|---|---|---|---|---|---|---|---|
| 141 | 21 | 17 | 13 | 9 | 5 | 1 |  |
| 142 | 22 | 18 | 14 | 10 | 6 | 2 |  |
| 143 | 23 | 19 | 15 | 11 | 7 | 3 |  |
| 144 | 24 | 20 | 16 | 12 | 8 | 4 |  |
| 145 |  | 21 | 17 | 13 | 9 | 5 | 1 |
| 146 |  | 22 | 18 | 14 | 10 | 6 | 2 |
| 147 |  | 23 | 19 | 15 | 11 | 7 | 3 |
| 148 |  | 24 | 20 | 16 | 12 | 8 | 4 |

In the apparatus of FIGURE 8, the digital signals to be processed are stored on digital tape transport 160. Prior to storage on transport 160, the seismic records have been corrected for normal moveout, as is well known in the art. Moreover, the digital signals on the tape of transport 160 are in demultiplexed form. That is, the first block of digital words played back by transport 160 will be all the words from the apparatus of FIGURE 4 which corresponds to the outputs of seismometer group member 1 in line 101 of FIGURE 6, composited for four shots. The next block of digital signals is the four shot composite from group two, and so on, with the twenty-fifth block corresponding to group 1 of line 102.

The operation of the apparatus of FIGURE 8 is to transfer the digitized seismic information from transport 160 to buffer storage registers 161–166 in such a manner that they will be arranged for addition by digital adder 168 in accordance with the above list. The operation of the system is controlled by timing control 167. Timing control 167 applies pulses to buffers 161–166, transport 160 and switches 169 in accordance with the pulse sequence shown in FIGURE 9. Control 167 may be simply an eight track magnetic tape or drum recorder with the pulses recorded thereon in accordance with FIGURE 9. Alternatively, it may be a logic circuit designed to generate the pulses. The long pulses on the "TAPE" and "SWITCH" lines of FIGURE 9 may be achieved by filtering an alternating current waveform which lasts for the period required of the pulse.

At the beginning of the operation of the system in FIGURE 8, timing control 167 applies the pulse 170 of FIGURE 9 to transport 160. This pulse, applied for example to a relay, allows transport 160 to begin reading out digital words through playback amplifier 171 into the input of buffer storage register 166. After enough time has elapsed for transport 160 to read in slightly more than the first five blocks of digital words stored thereon, the groups of pulses 172 of FIGURE 9 are initiated. The pulse diagrams in FIGURE 9, such as "BUFFER 161" indicate the pulses applied to the correspondingly numbered buffers of FIGURE 8. Thus, for the groups of pulses 172, a pulse is applied simultaneously to each of the buffers 161–166. The rate of occurrence of the individual pulses in groups 172 is the normal rate at which individual words of digital data are produced by transport 160. At the application of the first pulse in groups 172, the digital word in the output register of buffer 166 will be transferred to the input of buffer 165. Since it is the only word in buffer 165, it will automatically appear in the output register thereof. At the transfer of that word from buffer 166 to buffer 165, no digital information is transmitted to digital adder 168, because electronic switches 169 are in their normally open position. At the application of the second pulse, the digital word in the output register of buffer 165 is transferred to the input of buffer 164 and the output register of buffer 166 is transferred to the input register of buffer 165. There are enough pulses in groups 172 to switch twenty blocks of digital words from the output register of buffer 166 into succeeding registers, plus five additional words. After all the pulses in groups 172 have been applied, the digital word in the output register of buffer 161 will be the first digital word in the block of data corresponding to seismometer groups number 21 in line 101 of FIGURE 6. After the application of all the pulses in groups 172, the pulses in groups 173 are applied to all the buffers except buffer 161. Groups 173 of pulses contain enough pulses to switch one word less than twenty blocks of words out of the buffers pulsed. This causes the blocks of digital words corresponding to seismometer groups 21–24 for the first shot, that is for line 101 of FIGURE 6 to be stored in buffer 161. Further, it stores the blocks of digital words corresponding to seismometer groups 1–16 for the second shot, that is line 102 of FIGURE 6, following the blocks corresponding to the first shot. The contents of the buffer 161 are represented by the numbers in the block representing buffer in FIGURE 8. The numeral 21 on the right-hand side illustrates the block of digital words representing seismometer groups 21 ready to be read out of the buffer. The numeral 16 represents the block or digital words representing the seismometer group number 16 of the second shot is the last block of data read into the buffer. The numerals 1 and 2 in the upper part of the block represent the first and second shots respectively.

In each of the groups 174 of pulses, there is one less pulse than the number required to switch twenty blocks of digital words out of each of the buffers pulsed. The groups 174 of pulses are applied to all the buffers except buffers 161 and 162. As a result, buffer 162 is made to contain twenty blocks of words, since it contained one digital word before the application of the groups 174 of the pulses. The block of words having its first word in the output register of buffer 162 is that corresponding to seismometer group 17 of the second shot, or line 102 of FIGURE 6. The next succeeding blocks in buffer 162 correspond to seismometer groups 18–24 of the second shot and then groups 1–12 of the third shot. Following the application of the groups 174 of pulses, there are applied to buffers 164–166 the groups 175 of pulses, each of which contained one less than the number of pulses required to switch twenty blocks out of each of the buffers pulsed. The result is the filling of buffer 163 with twenty blocks of digital words corresponding to the seismometer groups 13–24 of the third shot and 1–8 of the fourth shot. The groups 176 of pulses also contain one less than the number of pulses required to switch twenty blocks of digital words out of the buffers pulsed, which are buffers 165 and 166. After the groups 176 of pulses have been applied, buffer 164 contains digital word blocks corresponding to seismometer groups 9–24 of the fourth shot 1–4 of the fifth shot. The group 177 of pulses, applied to buffer 166 also contains one less than the number of pulses required to switch twenty blocks of digital words into buffer 165. After the application of the pulses in the group 177, buffer 165 contains the blocks of digital words corresponding to seismometer groups 5–24 of the fifth shot or line 105, in FIGURE 6. At this same time, buffer 166 contains the slightly more than five blocks of digital words read into the buffer prior to the initiation of the pulses in groups 172. That initial number of digital words will be slightly increased or decreased by any variations of the input rate to buffer 166 due to fluctuations of the tape speed on transport 160, but the slight variations have no consequence in the operation of the circuit of FIGURE 8. The first five blocks of digital words in buffer 166 correspond to seismometer groups 1–5 of the sixth shot.

At the application of the last pulse in group 177, pulse 170 is terminated, stopping the playback of information from tape transport 160. The control of tape transport 160 may be effected by means of a relay responsive to the pulse 170. After the termination of pulse 170 and before the application of more pulses to the buffers, pulse 180 is applied to electronic switches 169 closing them. It is to be emphasized that the output leads from each of the buffers 161–166 are multiple leads, reading out each digital word in parallel form; hence, each of the switches 169 represents the plurality of switches required to switch the digital words in parallel form.

After the first switches 169 have been closed, the groups of pulses 181 are applied to all of the buffers 161–166. The rate at which the pulses in groups 181 are applied need not be the same as in, say group 177, but the pulses are applied to the buffers simultaneously. There are enough pulses in each of groups 181 to switch four blocks of digital words from the output of each buffer. At the application of each pulse in group 181 to the buffers, a digital word in the output register of each buffer is transferred into the input of digital adder 168, and the six digital words thus transferred are summed, the digital sum appearing at the output 183 of adder 168. The sum may be recorded on a magnetic tape transport 184 through record amplifier 185. When the first block of digital words have been thus transferred from the buffers, the apparatus of FIGURE 8 has in effect added the signals corresponding to seismometer group 21 (FIGURE 6) of the first shot, group 17 of the second shot, group 13 of the third shot, group 9 of the fourth shot, group 5 of the fifth shot, and group 1 of the sixth shot. That is, it has summed the signals corresponding to common depth point 141 of FIGURE 6 as illustrated in that figure and as shown in the above table. After the next block of digital words has been transferred from the buffers and summed by adder 168, the signals corresponding to common depth point 142 have been summed. Then the sums for depth points 143 and 144 are digitally computed.

After the application of the last pulse in groups 181, pulse 180 is terminated, opening switches 169. Then groups 182 of pulses are applied to the buffers to place them in readiness for the summations for the next common depth points. It is to be noticed that when each of the pulses in groups 181 are applied, a digital word was transferred from the buffers not only to digital adder 168, but also to the input of the following buffer. Thus, at the end of the pulses in groups 181, the block of words at the output of buffer 161 is that corresponding to seismometer group 1 of the second shot, and the last block of words in buffer 161 corresponds to seismometer group 20 of the second shot. In each of the groups 182 of pulses there are enough pulses to switch twenty blocks of words from one buffer to the next. Thus, after the application of the pulses in groups 182 the first block of digital words in buffer 161 corresponds to the twenty-first seismometer group in the second shot or line 102 in FIGURE 6. The first block in buffer 166 will then correspond to the seismometer group number one of the seventh shot (not shown) in FIGURE 6. At the application of the last pulse in groups 182, pulse 186 to transport 160 is terminated. Pulse 187 is applied to switches 169, and the groups 188 of pulses are applied to buffers 161–166 in the same manner as were groups 181, this time to sum the signals corresponding to common depth points 145–148. Then pulse 187 is terminated, and pulses like pulse 186 and the groups of pulses 182 are generated to prepare the apparatus for the summation of signals corresponding to the next common depth points. The sequence of preparation and summation are repeated for all common depth points for which sums are sought.

The multichannel processing performed by the apparatus of FIGURE 8 may also be performed on a general purpose digital computer. It may also be combined with further processing to produce additional enhancement of the seismic information. For example, the previously mentioned copending application, Ser. No. 356,776 describes a multichannel filtering process to be used in combination with common depth point stacking to improve the quality of the seismic record. Moreover, the storage of the seismic data in digital form makes possible the feasible application of complicated single channel processing techniques, such as the inverse convolution filtering process described in "Seismic Data Processing," Ser. No. 289,581 filed June 21, 1963 by John P. Burg, now abandoned. The inverse convolution process minimizes the effect of water multiples on the intelligibility of the seismic records.

It is to be understood that the above-described embodiment is merely illustrative of the applications of the principles of the invention. Numerous other arrangements may be devised by those skilled in the art without departing from the spirit and scope of the invention as defined by the appended claims.

What is claimed is:

1. A marine geophysical exploration system comprising:

mobile means for producing seismic disturbances at points along a marine path, a plurality of marine seismometers spaced apart over a predetermined spread and maintained at predetermined distances from said mobile means for generating analog electrical signals in seismometer output channels in response to energy of said disturbances, means for actuating said mobile means repetitively for producing said disturbances at intervals so that said points are spaced in an integer relationship to the distance between said seismometers, means responsive to said signals in each of said channels for producing digital electrical signals representative of said analog electrical signals, and means responsive to said digital signals at the input thereof for generating further digital signals representative of an analog waveform that is dependent on said analog electrical signals from more than one of said seismometer channels.

2. An exploration system as set forth in claim 1, wherein said last-mentioned means includes means for combining those of said digital signals at the input thereof which represent energy derived from a common depth point.

3. A marine geophysical exploration system comprising:

mobile means for producing seismic disturbances at points along a marine traverse, a plurality of marine seismometer groups spaced apart one from another along a predetermined spread length and maintained a predetermined distance from said mobile means for generating analog electrical signals in said plurality of seismometer groups in response to energy of said disturbances, means for actuating said mobile means at points spaced along said traverse on the order of the spacing between said groups, means responsive to said signals in each of said seismometer channels for producing digital electrical signals representative of said analog electrical signals, means responsive to said digital electrical signals for separately recording digital signals from each of said groups, and means for recording sets of said digital electrical signals composited on a common depth point basis.

4. An exploration system as set forth in claim 3, wherein said means for repetitively producing disturbances is a combustible gas source.

5. An exploration system as set forth in claim 3, further including means responsive to digital signals from said multiple seismometer channels to produce for each of said channels other electrical digital signals representative of a composite of electrical signals generated in said channel in response to successive ones of said disturbances.

6. An exploration system as set forth in claim 3, further including means responsive to said other digital signals for generating further digital signals representative of an analog waveform that is dependent on said analog electrical signals from more than one of said seismometer channels.

7. An exploration system as set forth in claim 3 wherein said means for separately recording said digital signals includes means for recording the digital signals resulting from each of said disturbances, while continuing the repetition of the disturbances uninterrupted.

8. An exploration system as set forth in claim 3 wherein said means for recording responsive to said digital electrical signals includes a plurality of recorders and means for switching the digital signals to be recorded from one to another of said plurality of recorders.

9. The method of marine seismic exploration which comprises:
continuously moving a seismic source along a marine traverse while repetitively producing seismic disturbances at spaced shot points along said traverse,
generating analog electrical signals in a plurality of seismic channels in response to arrival of energy of said disturbances at moving receiving points along said traverse which are spaced apart in predetermined relation to said shot points,
producing digital electrical signals representative of said analog signals in each of said plurality of seismic channels, and
generating in response to said digital signals further digital signals representative of an analog waveform that is dependent on said analog electrical signals from more than one of said seismic channels.

10. The method of claim 9, wherein said step of generating further digital signals comprises combining those of said digital signals which represent energy derived from a common depth point.

11. The method of marine seismic exploration which comprises:
continuously moving a seismic source along a marine traverse while repetitively producing seismic disturbances at spaced shot points along said traverse,
generating analog electrical signals in a plurality of seismic channels in response to arrival of energy of said disturbances at moving receiving points along said traverse which are spaced distances in integral relation to the distance between said shot points,
producing digital electrical signals representative of said analog signals in each of said plurality of seismic channels,
separately recording said electrical digital signals from each of said plurality of seismic channels, and
generating in response to said digital signals further digital signals representative of an analog waveform that is dependent on said analog electrical signals from more than one of said seismic channels.

12. The method of claim 11, wherein said generating of further digital signals is performed in response to intermediate digital signals produced by the further step of generating in response to the separately recorded electrical digital signals intermediate digital signals representing a composite of said analog electrical signals occurring in one of said seismic channels in response to successive ones of said disturbances.

References Cited

UNITED STATES PATENTS

| | | | |
|---|---|---|---|
| 3,281,775 | 10/1966 | Ritter | 340—7 X |
| 3,292,141 | 12/1966 | Hines et al. | 340—7 |
| 3,333,247 | 7/1967 | Hadley et al. | 340—15.5 X |
| 3,040,833 | 6/1962 | Mendenhall et al. | |
| 3,134,957 | 5/1964 | Foote et al. | 340—15.5 |
| 3,317,890 | 5/1967 | Hensley | 340—7 |
| 3,340,499 | 9/1967 | Hadley | 340—15.5 |

RODNEY D. BENNETT, Jr., *Primary Examiner.*

C. E. WANDS, *Assistant Examiner.*

U.S. Cl. X.R.

340—7